(12) United States Patent
Siddavanahalli

(10) Patent No.: US 8,913,797 B1
(45) Date of Patent: Dec. 16, 2014

(54) TECHNIQUES FOR DETERMINING A SOCIAL DISTANCE BETWEEN TWO PEOPLE

(75) Inventor: Vinay Siddavanahalli, Mountain View, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/467,633

(22) Filed: May 9, 2012

(51) Int. Cl.
*G06K 9/62* (2006.01)

(52) U.S. Cl.
USPC .......................................................... 382/118

(58) Field of Classification Search
None
See application file for complete search history.

(56) References Cited

U.S. PATENT DOCUMENTS

| | | | |
|---|---|---|---|
| 7,117,254 B2 | 10/2006 | Lunt et al. | |
| 7,999,728 B2 | 8/2011 | Chen et al. | |
| 2009/0319940 A1 | 12/2009 | Flake et al. | |
| 2010/0023584 A1 | 1/2010 | Kamdar et al. | |
| 2011/0182485 A1* | 7/2011 | Shochat et al. | 382/118 |

OTHER PUBLICATIONS

Wu et al. (Close & Closer: Discover Social Relationship From Photo Collections, IEEE publication, 2009, pp. 1652-1655.*
Business Insider, "How to Stop Facebook From Using Your Name and Photo in Ads", published on businessinsider.com on Mar. 21, 2011, 5 pages total.*

* cited by examiner

*Primary Examiner* — Brian P Werner

(57) ABSTRACT

According to some embodiments of the present disclosure, a technique is disclosed. The technique includes storing, at a computing device having one or more processors, a plurality of tagged photographs, each of the plurality of tagged photographs having one or more tags corresponding therewith, each of the one or more tags identifying a person in its corresponding tagged photograph. The technique further includes determining, a plurality of direct links between persons based on the plurality of tagged photographs. A direct link exists between a first person and a second person when the first and second persons are both tagged in at least one of the plurality of tagged photographs. The technique further includes a distance determination module that determines social distances between persons based on the determined direct links.

17 Claims, 6 Drawing Sheets

TECHNIQUES FOR DETERMINING A SOCIAL DISTANCE BETWEEN TWO PEOPLE

FIELD

The present disclosure relates to techniques for determining a social distance between two people based on tagged photographs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Social networking applications allow users to connect with one another in many different ways. These applications can provide features for users to meet new people, to obtain information, and to share interesting things. One such feature that social networking applications may provide is the ability for users to share photographs. Users can upload photographs to a social networking application server. Other users can view the photographs and may be allowed to provide commentary regarding the photographs.

Further, users can tag persons that appear in the photograph. Tagging a person in a photograph indicates an association of the tagged person with the photograph.

SUMMARY

According to some embodiments of the present disclosure, a system including a photograph database, a link determination module, a weighting module, and a distance determination module is disclosed. The photograph database stores a plurality of tagged photographs, each of the plurality of tagged photographs having one or more tags corresponding therewith, each of the one or more tags identifying a person in its corresponding tagged photograph. The link determination module determines direct links between persons, wherein a direct link exists between a first person and a second person when the first and second persons are both tagged in at least one of the plurality of tagged photographs. The weighting module determines a weight for each of the determined direct links. The weight of a particular direct link between particular persons is based on one of (i) a first total number of tagged photographs in which the particular persons are both tagged, wherein the weight is inversely related to the first total number and (ii) a second total number of persons in a tagged photograph in which the particular persons are both tagged, wherein the weight is positively related to the second total number. The distance determination module determines social distances between persons based on the determined direct links and the weights of the determined direct links. The distance determination module (i) receives a request to determine a specific social measurement distance between specific persons, and (ii) performs one of a depth first search and a breadth first search between the specific persons to determine the specific social measurement distance.

According to some embodiments of the present disclosure, a system including a photograph database, a link determination module, and a distance determination module is disclosed. The photograph database stores a plurality of tagged photographs, each of the plurality of tagged photographs having one or more tags corresponding therewith, each of the one or more tags identifying a person in its corresponding tagged photograph. The link determination module determines direct links between persons, wherein a direct link exists between a first person and a second person when the first and second persons are both tagged in at least one of the plurality of tagged photographs. The distance determination module determines social distances between persons based on the determined direct links.

According to some embodiments of the disclosed system, a first social distance between the first person and the second person is less than a second social distance between the first person and a third person that is not tagged in a tagged photograph in which the first person is also tagged.

According to some embodiments of the disclosed system, a social distance between any third person and any fourth person is based on the determined links, any fifth persons with whom the third person is linked, any sixth persons with whom the fourth person is linked, and the social distance between the fifth and sixth persons.

In some embodiments, the system further includes a weighting module that determines a weight for each of the direct links, wherein the social distance between persons is further based on the weights.

According to some embodiments the weight of a particular direct link between particular persons is based on a total number of tagged photographs in which the particular persons are both tagged. Furthermore, in some embodiments the weight of the particular direct link between particular persons is inversely related to the total number of tagged photographs in which the particular persons are both tagged.

According to some embodiments the weight of a particular link between particular persons is based on a total number of persons in a tagged photograph in which the particular persons are both tagged.

According to some embodiments, the distance determination module (i) receives a request to determine a specific social measurement distance between specific persons, and (ii) performs one of a depth first search and a breadth first search between the specific persons to determine the specific social measurement distance.

According to some embodiments of the present disclosure, a technique for determining a social measurement distance between two persons is disclosed. The technique includes storing, at a computing device having one or more processors, a plurality of tagged photographs, each of the plurality of tagged photographs having one or more tags corresponding therewith, each of the one or more tags identifying a person in its corresponding tagged photograph. The technique further includes determining, a plurality of direct links between persons based on the plurality of tagged photographs. A direct link exists between a first person and a second person when the first and second persons are both tagged in at least one of the plurality of tagged photographs. The technique further includes determining social distances between persons based on the determined direct links.

According to some embodiments of the disclosed technique a first social distance between the first person and the second person is less than a second social distance between the first person and a third person that is not tagged in a tagged photograph in which the first person is also tagged.

In some embodiments, the disclosed technique further includes determining a weight for each of the direct links wherein the social distance between persons is further based on the weights of the direct links.

According to some embodiments of the present disclosure the weight of a particular direct link between particular persons is based on a total number of tagged photographs in which the particular persons are both tagged. Furthermore, in some embodiments the weight of the particular link between the particular persons is inversely related to the total number of tagged photographs in which the particular persons are both tagged.

According to some embodiments of the present disclosure the weight of a particular link between particular persons is based on a total number of persons tagged in a tagged photograph in which the particular persons are both tagged. Furthermore, in some embodiments the weight of the particular link between the particular persons is positively related to the total number of persons.

According to some embodiments of the present disclosure the techniques further include receiving a request to determine a specific social measurement distance between specific persons, and performing one of a depth first search and a breadth first search between the specific persons to determine the specific social measurement distance.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
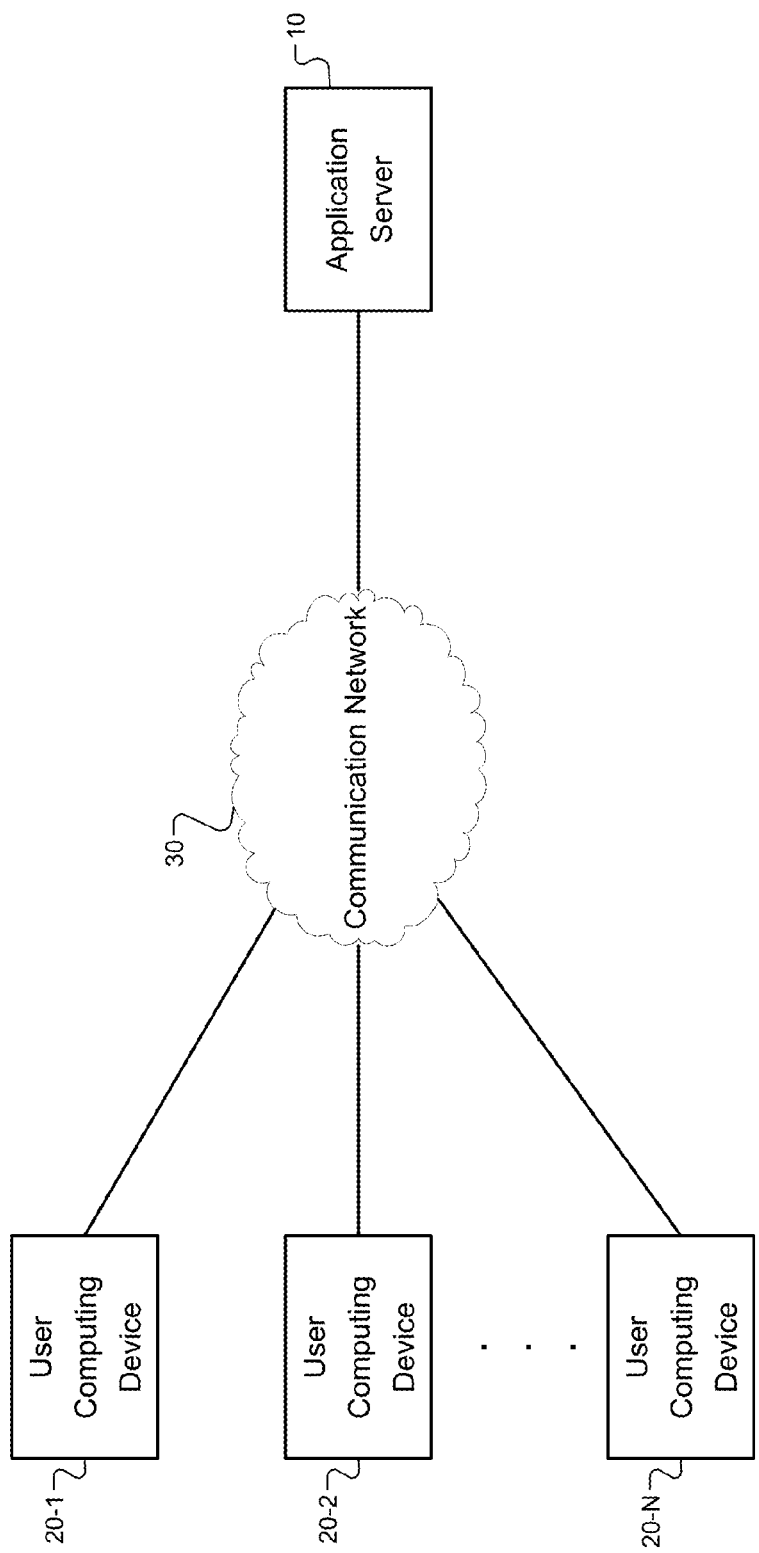
FIG. 1 is a block diagram illustrating an example environment for an application server according to various embodiments of the present disclosure.

Referring now to FIG. 1, an example environment for providing a social networking application to a plurality of users is provided. In the example, a social networking application server 10 (hereinafter "application server") provides the social networking application to a plurality of user computing devices, e.g., user computing device 20-1, 20-2, and 20-N (herein collectively referred to as "user computing device 20"), over a communication network 30, e.g., the Internet or an intranet. The application server 10 may be a one or more distributed or stand-alone servers, each having one or more processors. A social networking application can be any application that allows a plurality of users to interact with one another over the communication network 30. Some social networking applications can allow users to make relationships such as professional, romantic, and/or social connections. Further, some social networking applications allow users to view profiles of other users.

One feature that is common to many social networking applications is the sharing of photographs. The application server 10 may allow users to upload photographs, e.g., from the user computing device 20. The application server 10 can further allow other users to view the photographs and in some instances comment on the photographs. Further, the users can tag the photographs. It should be appreciated that tagging a photograph can include associating a metadata tag (hereinafter "tag") with the photograph. In some instances, the tag may indicate that the person tagged in the photograph is in the photograph or is somehow related to the photograph.

In some embodiments, the application server 10 can be configured to determine a social distance between two persons based on a plurality of tagged photographs. A social distance between persons can be a "degree of separation distance" between the first person and the second person. It should be appreciated that a person can be a user of the social networking application or can be a non-user. By determining a social distance between a user and another person, the user can see how far removed he or she is from particular persons, e.g., celebrities or friends of friends. Additionally, the application server 10 can use the social distances to provide recommendations to the user based on the interests of other persons within a certain distance from the user. Similarly, the social distance between the user and another person can be used to provide the other person access to the user's profile or portions of the user's profile if the person is within a certain distance from the user. It is appreciated that the application server 10 can utilize the social distances between two people for any other suitable application.

Figure 2:
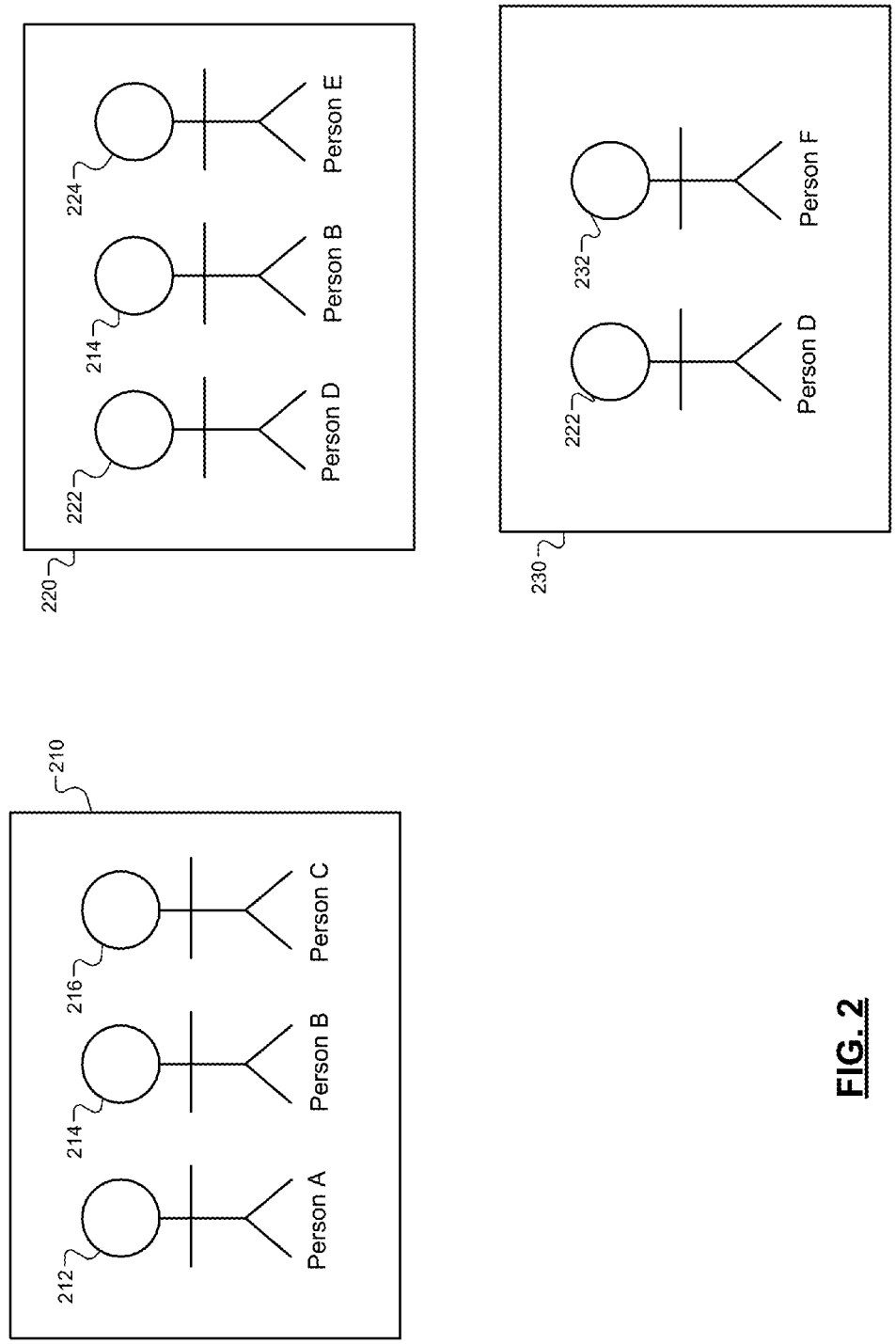
FIG. 2 is a drawing illustrating a plurality of tagged photographs according to various embodiments of the present disclosure.

FIG. 2 illustrates an example of three tagged photographs, i.e., a first photograph 210, a second photograph 220, and a third photograph 230. The tagged photographs can be used to determine a social distance between two persons. As will be described in further detail below, two persons are said to have a direct link between them (or are "directly linked") when the two persons are tagged in the same photograph. For instance, the first photograph 210 includes Person A 212, Person B 214, and Person C 216. Thus, in the illustrated example, Person A 212 is directly linked to Person B 214 and Person C 216. Furthermore, both Person B 214 and Person C 216 are directly linked to Person A. Moreover, Person B 214 and Person C 216 are directly linked to one another.

In the second photograph 220, Person B 214, Person D 222, and Person E 224 are tagged. Thus, Person B 214 is directly linked to Person D 222, and Person E 224. In this example, Person D 222 and Person E 224 are both directly linked to Person B 214. Moreover, Person D 222 and Person E 224 are directly linked to on another. In the third photograph 230, Person D 222 and Person F 232 are tagged. Thus, Person D 222 is directly linked to Person F 232, and vice-versa.

In the illustrated example, a social distance can be determined between any two of the persons in the example. For example, a social distance can be determined between Person A 212 and Person F 232. For instance, a chain of direct links can be identified between Person A 212 and Person F 232, via the direct links between Person A 212 and Person B 214, Person B 214 and Person D 222, and Person D 222 and Person F 232. Thus, Person A 212 and Person F 232 can be said to be "indirectly linked" via three direct links or by a set of interconnected persons, e.g., Person B 214 and Person D 222.

Figure 3:
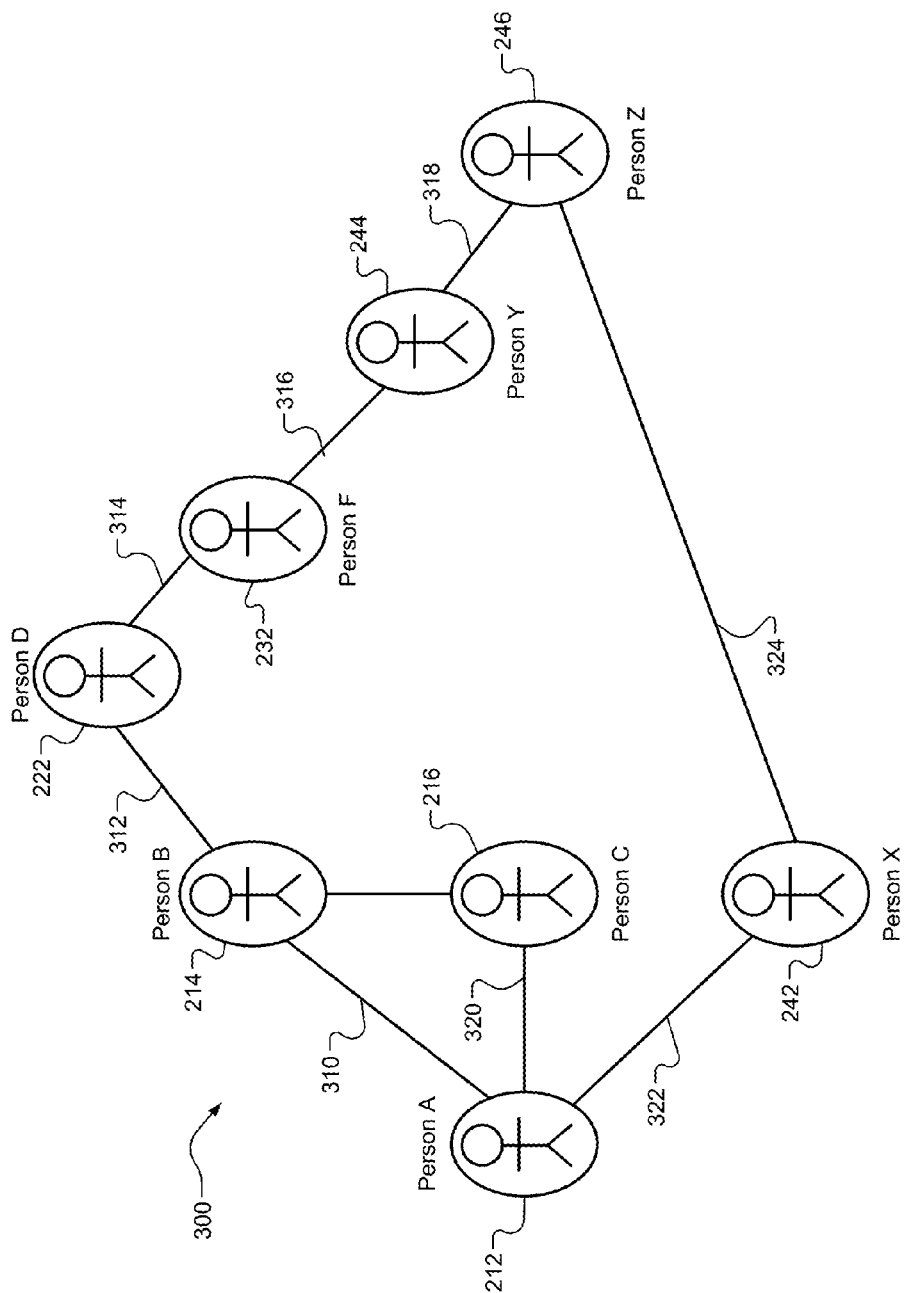
FIG. 3 is a drawing illustrating a graph of interconnected persons according to various embodiments of the present disclosure.

FIG. 3 illustrates a graph 300 of interconnected persons, which can be arranged to identify one or more indirect links between Person A 212 and Person Z 246. In the illustrated example, Person A 212 is directly linked to Person B 214 (direct link 310), Person C 216 (direct link 320), and Person X 242 (direct link 322). Person B 214 is directly linked to Person D 222 (direct link 312), who is directly linked to Person F 232 (direct link 314). Person F 232 is directly linked to Person Y 244 (direct link 316), who is directly linked to Person Z 246 (direct link 318). Thus, an indirect link can be made between Person A 212 and Person Z 246 via direct links 310, 312, 314, 316, and 318. Similarly, Person X 242 is directly linked to Person Z (direct link 324). Thus, another indirect link can be made between Person A 212 and Person Z via direct links 322 and 324.

As will be discussed in further detail below, a social distance between any two persons can be determined based on the direct links determined from a plurality of tagged photographs. For example, a social distance can be determined between a first person and second person based on the direct links and/or indirect links between the first and second person. For instance, assuming all direct links have a weight of one unit (as will be described further below, direct links can be assigned variable weights based on various criteria), the social distance between Person A 212 and Person Z 246 is two. The indirect link via Person B 214, Person D 222, Person F 232, and Person Y 244 can be determined to have a social distance of five, while the indirect link via Person X 242 can be determined to have a social distance of two. In some examples where the path of least distance is used to determine the social distance between two persons, the social distance between Person A 212 and Person Z in the illustrated example is, therefore, two.

Figure 4:
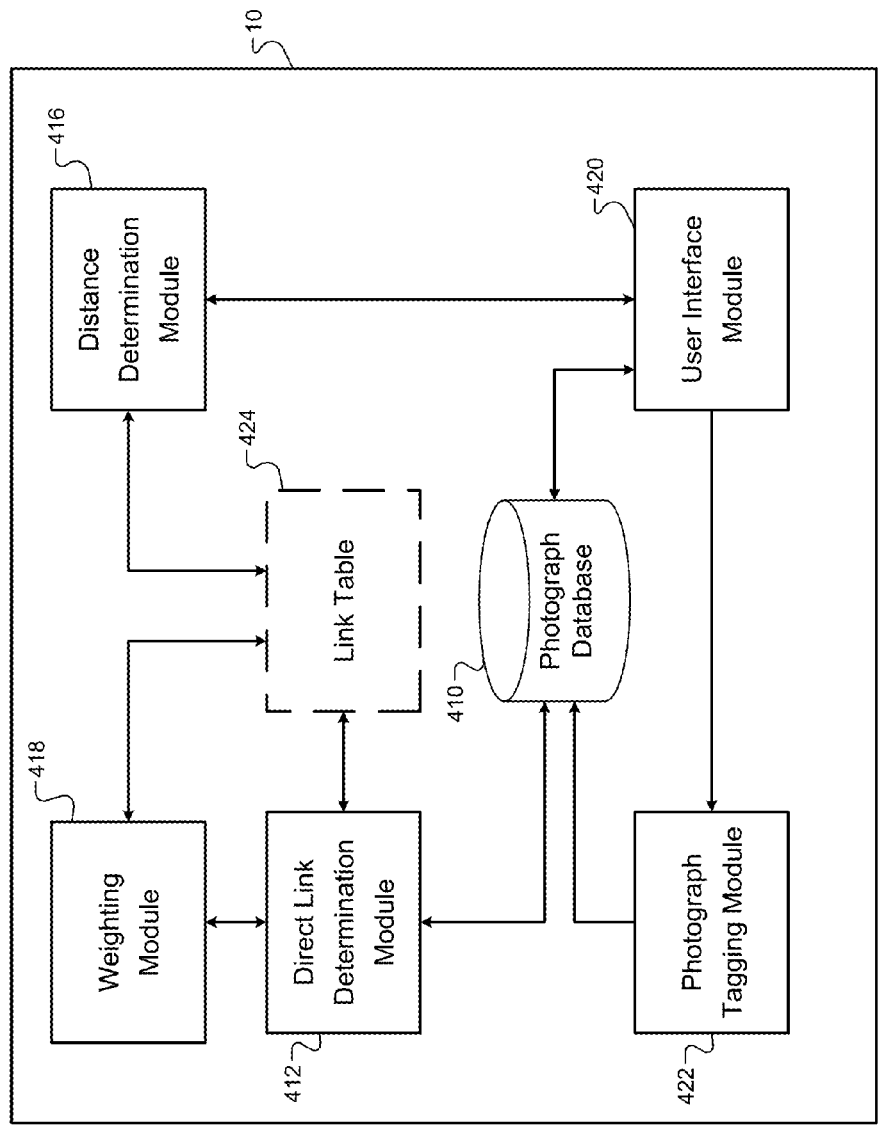
FIG. 4 is a block diagram illustrating example components of the application server of FIG. 1 according to various embodiments of the present disclosure.

Referring now to FIG. 4, example components of an application server 10 configured to determine social distances between two persons are shown. The application server 10 can include a photograph database 410, a link determination module 412, a distance determination module 416, a weighting module 418, a user interface module 420, and a photograph tagging module 422. It should be appreciated that the application server 10 can include additional components.

The photograph database 410 stores a plurality of photographs that are uploaded by various users. At least some of the photographs stored in the photograph database 410 are tagged such that the tagged photographs have at least one tag corresponding therewith. As discussed above, a tag corresponding to a person indicates that the person has been associated with the photograph in which the person has been tagged. In some embodiments, the photographs can be labeled as public or private. In these embodiments, the application server 10 can be configured to only utilize public photographs to determine a social distance between two persons. Information pertaining to a particular photograph, such as tags associated with the particular photograph and whether the particular photograph is public or private, can be stored in the metadata of the particular photograph. As should be appreciated, the metadata of the particular photograph can be stored in the photograph database 410 as well.

The user interface module 420 allows users to interact with the application server 10. As should be appreciated, the user interface module 420 can present a graphical user interface (GUI) to the user. The GUI, for example, can display profiles of users, commentary provided by users, and photographs of the users, as well as indicators of persons tagged in the photograph. Further, the user interface module 420 can receive commands from a user via the GUI. For instance, the user interface module 420 can receive a command to tag a person in a photograph or a command to determine a social distance between two persons.

The photograph tagging module 422 can receive a command to tag a person in a photograph. Upon receiving the command, the photograph tagging module 422 generates a tag to associate with the photograph. As discussed above, the tag may be an indicator of the person being tagged, e.g., the name of the person. Upon generating the tag, the photograph tagging module 422 can associate the tag with the photograph by, for example, storing the tag with the metadata of the photograph.

The link determination module 412 can be configured to determine the direct links between persons based on the tagged photographs stored in the photograph database 410. The link determination module 412 can search the photograph database 410 to identify photographs having tags associated therewith. To determine direct links corresponding to a tagged photograph, the link determination module 412 can analyze the metadata of the tagged photograph to determine whether more than one person is tagged in the photograph. If more than one person is tagged in the tagged photograph, the link determination module 412 can generate a direct link for each pair of persons appearing in the tagged photograph. For instance, in the example of FIG. 2, when analyzing the first photograph 210, the link determination module 412 can identify direct links between Person A 212 and Person B 214, Person A 212 and Person C 216, and Person B 214 and Person C 216.

The link determination module 412 can record any direct links in a link table 424. In some embodiments, the link table 424 can list the direct and/or the indirect links of each person tagged in at least one photograph in the photograph database 410. It should be appreciated that while a link table 424 is shown that in FIG. 3, multiple link tables 424 can be implemented as well. Thus, in some embodiments, each person tagged in any of the photographs stored in the photograph database 410 may have a corresponding link table. Table I (Link Table of Person A) illustrates an example of a link table that indicates the direct links of person A:

TABLE I (Link Table of Person A)

| Person | Direct Link? |
|---|---|
| B | Yes |
| C | Yes |
| D | No |
| E | No |
| F | No |
| X | Yes |
| Y | No |
| Z | Yes |

The foregoing is provided for example. It is appreciated that the link table 424 can be for more than one person and may list all identified direct links. Further, as will be discussed in further detail below, a weight may be associated with each direct link. Thus, the weight of a direct link may also be stored in the link table 424.

The link determination module 412 can be further configured to determine whether an indirect link exists between two persons that are not directly linked. The link determination module 412 can determine whether an indirect link exists between the first person and the second person by performing a breadth-first or depth-first search of the link table 424 beginning with one of the direct links of the first person and the direct links of the second person. Building upon the direct links of the first person or the second person, the link determination module 412 can attempt to determine whether at least one chain of direct links can be made between the first person and the second person.

For example, if the link determination module 412 is configured to perform a breadth-first search, the link determination module 412 can identify all the persons to which the first person is linked based on the link table 424. The link determination module 412 can then determine which persons are linked to one of the persons that are directly linked to the first person. The link determination module 412 can continue to iterate in this manner until a chain of direct links between the first person and the second person has been identified, or until all possible paths have been analyzed and no indirect link can be identified. Furthermore, in some embodiments, the link determination module 412 can be configured to limit searches to a maximum amount of direct links. That is, the link determination module 412 can stop analyzing a particular chain of direct links once the number of direct links in the chain exceeds a threshold, e.g., four direct links.

It should be appreciated that the link determination module 412 can populate the link table 424 to indicate whether an indirect link exists between the first person and the second person. Building upon Table I and FIG. 3, Table II illustrates an example of a link table with a field for indirect links:

TABLE I (Link Table of Person A)

| Person | Direct Link? | Indirect Link? | Chain of Direct Links |
|---|---|---|---|
| B | Yes | NA | A-B |
| C | Yes | NA | A-C |
| D | No | YES | A-B-D |
| E | No | YES | A-B-D-E |
| F | No | YES | A-B-D-E-F |
| X | Yes | NA | A-X |
| Y | No | YES | A-B-D-F-Y |
| Z | Yes | NO | A-B-D-F-Y-Z<br>A-X-Z |
| Q (Not shown) | NO | NO | NO INDIRECT LINK |

In the example above, the link determination module 412 can determine chains of direct links between the first person and a second person and list the chains of direct links in the link table.

In some embodiments, the direct links may each be assigned a weight. A weight of a particular direct link can define a weight of the particular direct link. Thus, when a direct link between two persons is assigned a higher weight, the social distance between the two persons is greater than if a lesser weight was assigned to the direct link between the two persons. The weighting module 418 can assign a weight to each direct link between two persons based on criteria that tend to indicate a strength of a relationship between the two persons. In some embodiments, the weighting module 418 may assign a weight to a direct link between a two persons based on how many photographs the two persons appear in. In these embodiments, the weight of a direct link may be inversely related to the number of photographs that the persons appear in together. For instance, if the two persons appear in many photographs together, e.g., more than ten photographs, a relatively low weight may be assigned to the direct link between the two persons, e.g., weight=1. If, however, the two persons appear in only one photograph together, a relatively high weight may be assigned to the direct link between the two persons, e.g., weight=10. In some embodiments the weight of a direct link can be determined according to or based on:

$$\text{weight (direct\_link)} = \left(\frac{K}{\text{number\_of\_photographs\_with\_A\_and\_B}}\right)$$

where the weight (direct_link) is the weight of a direct link between Person A and Person B, K is a constant, and number_of_photographs_with_A_and_B is the number of photographs where both Persons A and B are both tagged.

In some embodiments, the weighting module 418 may assign weight to a direct link based on how many other persons appear in the photograph on which the direct link is based. In these embodiments, the weight may be positively related to the total number of persons appearing in a photograph on which the direct link is based. For example, if only the two persons appear in the photograph, then a relatively low weight may be assigned to the direct link, e.g., weight=1. If, however, ten or more persons appear in the photograph, then a relatively high weight may be assigned to the direct link, e.g., weight=10. In some embodiments the weight of a direct link can be determined according to or based on:

$$\text{weight (direct\_link)} = \left(\frac{\text{number\_of\_persons\_in\_photograph}}{K}\right)$$

where the weight(direct_link) is the weight of a direct link between Person A and Person B, K is a constant, and number_of_persons_in_photoograph is the number of persons that appear in the particular photograph on which the direct link between Person A and Person B was based.

It should be appreciated that the weighting module 418 can base the weight of a direct link on other criteria as well as on combinations of the criteria discussed above.

The distance determination module 416 can determine a social distance between a first person and a second person based on the determined direct links, and in some embodiments, the weights associated to the direct links. For example, the distance determination module 416 can determine the social distance between the first person and the second person based on either i) a direct link between the first person and the second person or ii) a chain of direct links between the first person and second person.

In embodiments where the direct links are not assigned weights, the distance determination module 416 can determine that the social distance between the first and second person would be one unit when the first person and the second person are directly linked. If the first person and the second person are not directly linked, the distance determination module 416 can determine the social distance between the first person and the second person based on the total number of direct links in the chain of direct links connecting the first person and the second person. If more than one chain of direct links connects the first person and the second person, the distance determination module 416 can use the shortest chain of direct links, i.e., the shortest indirect link, to determine the social distance between the first person and the second person. It should be appreciated that in these embodiments, a first social distance between two persons that are both tagged in a tagged photograph is less than a second social distance between two persons that are not tagged in any tagged photographs together.

In the embodiments where the direct links are assigned weight values, the distance determination module 416 can determine the social distance between the first person and the second person using known "shortest route" algorithms. For instance, the distance determination module 416 can implement Dijkstra's Algorithm to determine the shortest path between the first person and the second person. In these embodiments, the distance determination module 416 would take the weight of each of the determined direct links in consideration when determining a "shortest route" between the first person and the second person. In these embodiments, a situation may arise where the first person and the second person are directly linked, but the shortest route is actually an indirect link between the first person and the second person due to the weight of the direct link between the first person and the second person, and the weights of the direct links in the chain of direct links that indirectly link the first person to the second person.

Thus, a social distance between the first person and the second person can be based on the determined direct links, any third persons with whom the third person is directly linked, any fourth persons with whom the second person is directly linked, and the social distance between the third and fourth persons. For example, if the first person and the second person are directly linked then the social distance between the first person and the second person can be equal to the weight of the direct link between the first person and the second person. Further, if a direct link does not exist between the first person and the second person, the distance determination module 416 can determine the social distance between the first person and the second person based on the third persons to whom the first person is directly linked and/or fourth persons to whom the second person is directly linked. For example, if the first person and the second person are both directly linked to the same person, e.g., an intermediate person, then the social distance between the first person and the second person can be based on a first social distance between the first person and the intermediate person and a second social distance between the second person and the intermediate person. Furthermore, if the first person and the second person are not directly linked to at least one common intermediate person, the distance determination module 416 can determine the social distance between the first person and the second person by determining all of the third persons that the first person is directly linked to and all of the fourth persons that the second person is directly linked to and the social distances between the third persons and the fourth persons.

Once the distance determination module 416 determines a social distance between the first person and the second person, the distance determination module 416 can store the social distance in a distance table (not shown) or in the link table 424. The distance determination module 416 can populate the distance table with the social distances between each person that is tagged in the photograph database 410 in relation to the other persons tagged in the photograph database 410, provided that a direct or indirect link exists between the two persons. Further, the distance determination module 416 can provide the social distance between the first person and the second person to the user interface module 420 for display to a user. For example, the user, e.g., the first person, can be shown the social distance between him or her and a celebrity, e.g., the second person. Further, the user interface module 420 can present for display to the user the photographs on which the indirect or direct link is based.

While the foregoing techniques are explained with respect to a first user and a second user, it should be appreciated that the application server 10 can be configured to determine distances between all persons tagged in the photograph database 410. In these embodiments, the link table 424 and/or the distance table can be maintained as a look-up table, where the social distance between any two persons (if connected) can be determined from the link table 424.

Figure 5:
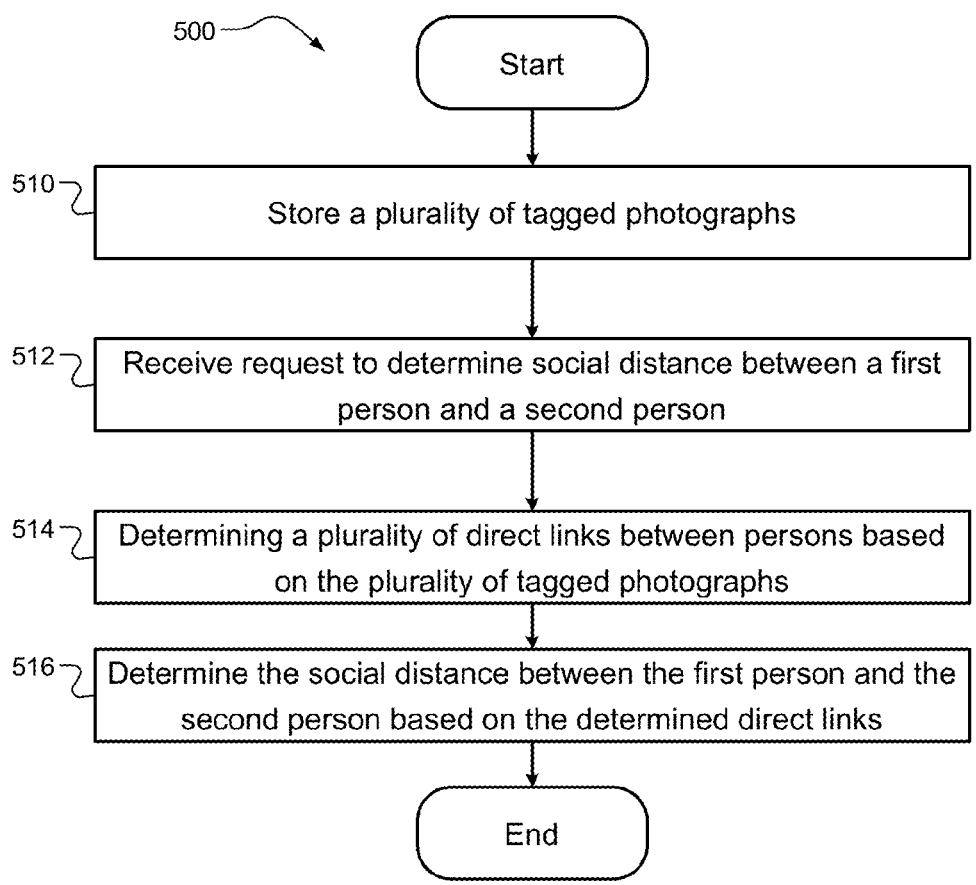
FIG. 5 is a flow chart illustrating an example technique for determining a social distance between a first person and a second person according to various embodiments of the present disclosure.

Referring now to FIG. 5, an example technique 500 for determining a social distance between a first person and a second person is illustrated. At 510, the application server 10 stores a plurality of tagged photographs from a plurality of users. It should be appreciated that the users can upload and tag the photographs over a continuous period of time. Furthermore, the users can continue to tag photographs after uploading the photographs.

At 512, the application server 10 can receive a request to determine a social distance between a first persona and a second person. The request may be received from a user of a social networking application or from the social networking application. At 514, the application server 10 can analyze the plurality of tagged photographs to determine a plurality of direct links between persons tagged in the photographs. The application server 10 can analyze each tagged photograph to determine if more than one person is tagged in the photograph. If more than one person is tagged in the photograph, the application server 10 can determine direct links between each pair of persons in the photograph by, for example, storing the direct links in the link table 424 (FIG. 4). At 516, the application server 10 determines a social distance between the first person and the second person based on the determined direct links.

As should be appreciated, the foregoing technique 500 is provided for example only and not intended to be limiting. Further, variations of the technique 500 are contemplated and are within the scope of the disclosure.

Figure 6:
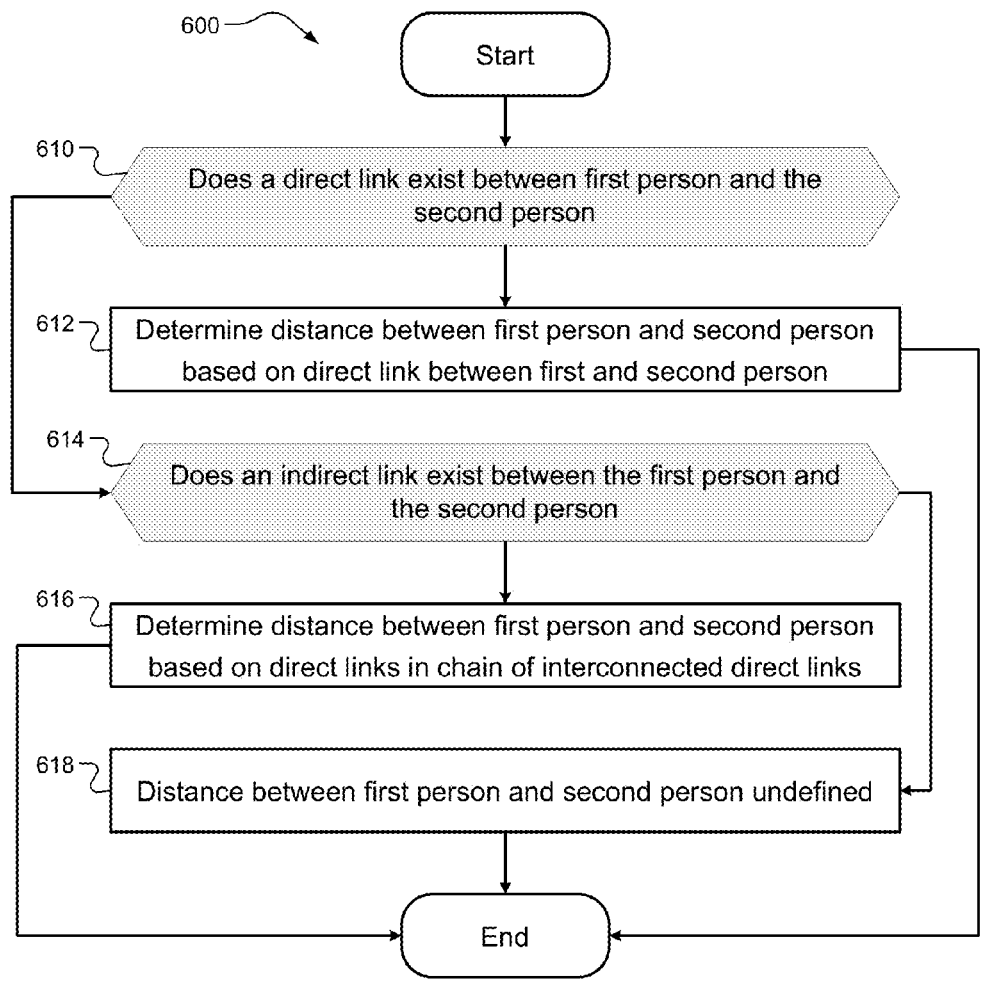
FIG. 6 is a flow chart illustrating an example technique for determining the social distance between the first person and the second person based on determined direct links according to various embodiments of the present disclosure.

FIG. 6 illustrates an example technique 600 for determining a social distance between a first person and a second person based on the directed links. At step 610, the application server can determine whether there is a direct link between the first person and the second person. The application server 10 analyzes a plurality of tagged photographs to determine whether the first person and the second person are tagged in the same photograph. If there is a direct link between the first person and the second person, the application server 10 can determine a social distance between the first person and the second person based on the direct link, as shown at 612. As previously discussed, direct links may or may not be weighted. In embodiments where the direct links are not weighted, the social distance between the first and second person can be set to one, e.g., one direct link. In embodiments where the direct links are weighted, the social distance between the first person and the second person is equal to the weight of the direct link.

If the first person and the second person are not directly linked, the application server 10 determines whether there is an indirect link between the first person and the second person, as shown at 614. The application server 10 can perform a breadth-first or depth-first search of the tagged photographs beginning with the direct links of one of the first person and the second person. The application server 10 can continue to iterate through the direct links of interconnected persons until either at least one indirect link between the first person and the second person is identified, or the application server 10 determines that there is no indirect link between the first person and the second person.

If the application server 10 identifies at least one indirect link between the first person and the second person, the application server 10 can determine a social distance between the first person and a second person based on the chain of direct links connecting the first person and second person, as shown at 616. If the direct links are not weighted, the application server 10 can determine the social distance between the first and second person by totaling the amount of direct links in the shortest chain of direct links between the first person and the second person. If the direct links are weighted, the application server 10 can determine the social distance between the first and second person by executing a shortest path algorithm on the chains of direct links. For instance, the application server 10 can execute Dijkstra's Algorithm. If there are no indirect links between the first and second person (or if all of the chains of direct links have more direct links than a predetermined threshold, e.g., five), the application server 10 determines that the first person and the second person are not connected and the social distance therebetween is undefined, as shown at 618.

As should be appreciated, the foregoing technique 600 is provided for example only and not intended to be limiting. Further, variations of the technique 600 are contemplated and are within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system, comprising:
one or more processors configured to perform operations including:
receiving a plurality of tagged photographs, each of the plurality of tagged photographs having one or more tags corresponding therewith, each of the one or more tags identifying a person in its corresponding tagged photograph;
determining direct and indirect links between persons, based on one or more tags, wherein a direct link exists between a first person and a second person when the first and second persons are both tagged in at least one of the plurality of tagged photographs;
determining a weight for each of the determined direct links, wherein the weight of a particular direct link between particular persons is based on one of (i) a first total number of tagged photographs in which the particular persons are both tagged, wherein the weight is inversely related to the first total number and (ii) a second total number of persons in a tagged photograph in which the particular persons are both tagged, wherein the weight is positively related to the second total number,
and wherein the determining direct and indirect links between persons includes populating a link table, the link table includes entries that indicate a direct link, indirect link, and a chain of direct links to other people; and
determining social distances between persons based on the determined direct links and the weights of the determined direct links, wherein the distance determination (i) receives a request to determine a specific social measurement distance between specific persons, and (ii) performs one of a depth first search and a breadth first search between the specific persons to determine the specific social measurement distance.

2. A system comprising:
one or more processors configured to perform operations including:
receiving a plurality of tagged photographs, each of the plurality of tagged photographs having one or more tags corresponding therewith, each of the one or more tags identifying a person in its corresponding tagged photograph;
determining direct and indirect links between persons, wherein a direct link exists between a first person and a second person when the first and second persons are both tagged in at least one of the plurality of tagged photographs, and wherein the determining direct and indirect links between persons includes populating a link table, the link table includes entries that indicate a direct link, indirect link, and a chain of direct links to other people;
determining social distances between persons based on the determined direct links;
determining a weight for each of the direct links, wherein the social distance between persons is further based on the weights.

3. The system of claim 2, wherein a first social distance between the first person and the second person is less than a second social distance between the first person and a third person that is not tagged in a tagged photograph in which the first person is also tagged.

4. The system of claim 2, wherein a social distance between any third person and any fourth person is based on the determined links, any fifth persons with whom the third person is linked, any sixth persons with whom the fourth person is linked, and the social distance between the fifth and sixth persons.

5. The system of claim 2, wherein the weight of a particular direct link between particular persons is based on a total number of tagged photographs in which the particular persons are both tagged.

6. The system of claim 5, wherein the weight of the particular direct link between particular persons is inversely related to the total number of tagged photographs in which the particular persons are both tagged.

7. The system of claim 2, wherein the weight of a particular link between particular persons is based on a total number of persons in a tagged photograph in which the particular persons are both tagged.

8. The system of claim 2, wherein the distance determination module (i) receives a request to determine a specific social measurement distance between specific persons, and (ii) performs one of a depth first search and a breadth first search between the specific persons to determine the specific social measurement distance.

9. The system of claim 2, wherein the weight of a particular direct link between particular persons is inversely related to a total number of tagged photographs in which the particular persons are tagged.

10. The system of claim 2, wherein the weight of a particular direct link between particular persons is based on a total number of persons in a tagged photograph in which the particular persons are both tagged.

11. A computer implemented method, comprising:
storing, by a computing device having one or more processors, a plurality of tagged photographs, each of the plurality of tagged photographs having one or more tags corresponding therewith, each of the one or more tags identifying a person in its corresponding tagged photograph;
determining, by the computing device, a plurality of direct and indirect links between persons based on the plurality of tagged photographs, wherein a direct link exists between a first person and a second person when the first and second persons are both tagged in at least one of the plurality of tagged photographs, and wherein the determining direct and indirect links between persons includes populating a link table, the link table includes entries that indicate a direct link, indirect link, and a chain of direct links to other people;

determining, by the computing device, social distances between persons based on the determined direct links; and determining, by the computing device, a weight for each of the direct links, wherein the social distance between persons is further based on the weights.

12. The method of claim 11, wherein a first social distance between the first person and the second person is less than a second social distance between the first person and a third person that is not tagged in a tagged photograph in which the first person is also tagged.

13. The method of claim 11, wherein the weight of a particular direct link between particular persons is based on a total number of tagged photographs in which the particular persons are both tagged.

14. The method of claim 13, wherein the weight of the particular link between the particular persons is inversely related to the total number of tagged photographs in which the particular persons are both tagged.

15. The method of claim 11, wherein the weight of a particular link between particular persons is based on a total number of persons tagged in a tagged photograph in which the particular persons are both tagged.

16. The method of claim 15, wherein the weight of the particular link between the particular persons is positively related to the total number of persons.

17. The method of claim 11, further comprising receiving a request to determine a specific social measurement distance between specific persons, and performing one of a depth first search and a breadth first search between the specific persons to determine the specific social measurement distance.

* * * * *